United States Patent
Wise (10) Patent No.: US 7,237,228 B1
(45) Date of Patent: Jun. 26, 2007

(54) ARBITRARY AND EXPANDABLE HIGH-PRECISION DATATYPE AND METHOD OF PROCESSING

(75) Inventor: Ashley K. Wise, Zimmerman, MN (US)

(73) Assignee: Unisys Corporation, Blue Bell, PA (US)

( * ) Notice: Subject to any disclaimer, the term of this patent is extended or adjusted under 35 U.S.C. 154(b) by 703 days.

(21) Appl. No.: 10/008,952

(22) Filed: Dec. 6, 2001

(51) Int. Cl.
*G06F 9/44* (2006.01)
*G06F 7/00* (2006.01)

(52) U.S. Cl. ............... 717/114; 707/100; 707/101; 707/102; 717/115; 717/116; 717/117

(58) Field of Classification Search ............ 708/200, 708/204, 490, 495–513, 518, 604; 717/101, 717/104, 140–148, 114–119; 707/100–102
See application file for complete search history.

(56) References Cited

U.S. PATENT DOCUMENTS

| | | | | |
|---|---|---|---|---|
| 5,446,901 | A * | 8/1995 | Owicki et al. ............... | 711/154 |
| 5,619,711 | A * | 4/1997 | Anderson .................... | 712/221 |
| 5,640,496 | A * | 6/1997 | Hardy et al. ................ | 345/421 |
| 6,078,994 | A * | 6/2000 | Carey ......................... | 711/133 |
| 6,505,284 | B1 * | 1/2003 | Rabinovici et al. ......... | 711/170 |
| 2001/0047361 | A1 * | 11/2001 | Martin et al. ............ | 707/103 R |

OTHER PUBLICATIONS

Christoph Burnikel and Joachim Ziegler, "Fast Recursive Division", Max-Planck-Institut☐☐fuer Informatik Research Report MPI-I-98-1-022,☐☐http://data.mpi-sb.mpg.de/internet/reports.nsf/NumberView/1998-1-022 (downloaded Dec. 1, 2004).*

Jon White "Reconfigurable, Retargetable Bignums : A Case Study in Efficient, Portable Lisp System building" Proceedings of the 1986 ACM conference on LISP and functional programming, Cambridge, Massachusetts; p. 174-191, 1986.*

W. T. Wyatt, D. W. Lozier, D. J. Orser "A Portable Extended Precision Arithmetic Package and Library With Fortran Precompiler" ACM TOMS v2.3 1976.*

Utah, Feb. 1981☐☐{Brooks 1086] Brooks, R., Poener, D, et al., Design of☐☐ Knuth, D., "The Art of Computer Programming, vol. II", Second Edition, Addison-☐☐Wesley, 1981.*

(Continued)

*Primary Examiner*—Meng-Al T. An
*Assistant Examiner*—Jason Mitchell
(74) *Attorney, Agent, or Firm*—Charles A. Johnson; Mark T. Starr; Crawford Maunu, PLLC (57) ABSTRACT

A method and apparatus for processing numerical values in a computer program. In various embodiments, the invention provides an arbitrary and expandable high-precision datatype. The datatype encapsulates large-integer data and associated operators. The large-integer data has runtime expandable precision, and the operations perform functions on large-integer data and system integer data in a manner that is functionally equivalent to corresponding language-provided integer operations. The language-provided integer operations are overloaded with the operations of the large-integer datatype, whereby a user is unburdened with special commands and syntax, and large-integer data is inter-operable with system integer data.

17 Claims, 3 Drawing Sheets

OTHER PUBLICATIONS

Guy Steele "Common Lisp the Language" second edition. Posted Jan. 30, 1979, Downloaded 11/31/04.*
Guy Steele "Common Lisp the Language" second edition. Posted Jan. 30, 1979, Downloaded May 24, 2005.*
Esakov, Weiss "Data Structures An Advanced Approach Using C", 1998, Prentice Hall, pp. 10-23.*
"Recursion" from Wikipedia (http://en.wikipedia.org/wiki/Recursion).*
Hares and Smart "Object Orientation" 1993, John Wiley & Sons Ltd., pp. 1-41.*

* cited by examiner

ARBITRARY AND EXPANDABLE HIGH-PRECISION DATATYPE AND METHOD OF PROCESSING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to numeric datatypes in programming languages, and more particularly to a numeric datatype that is expandable to a high level of precision.

BACKGROUND OF THE INVENTION

High-precision arithmetic is useful in computer programs that are directed to solving problems in certain disciplines. Similar classes of applications may also require arbitrary size arithmetic.

While arithmetic data sizes of 32 or 64 bits are sufficient for many applications, some highly-specialized applications may require hundreds or thousands of bits of precision. When dealing with very large numbers, relatively small—yet significant—changes will be lost with limited precision. For example, when dealing with a double precision datatype, $10^{30}+1$ billion=$10^{30}$. In other words, 1 billion is lost in the computation. Many supercomputing application such as physics modeling and numerical methods suffer from accumulated errors due to limited-precision rounding. In another example, some supercomputing applications, such as astrophysics and encryption, deal with extremely large numbers. An "int" datatype typically offers 32 bits of size and supports values in the range of 4 billion, and the "double" datatype offers 1024 bits of size and supports values in the range of $10^{400}$. For these applications, the range provided by "int" and "double" datatypes may be insufficient.

Special libraries have been developed to accommodate high-precision arithmetic. An example library of functions that supports arbitrary precision arithmetic is the GNU MP (GMP) library. The GMP library provides special functions that are available for use in manipulating high-precision data. To arithmetically manipulate high-precision data with the GMP library, a user must learn the names, behavior, and parameters of various specialized functions provided in the library. Thus, there is a significant learning curve that accompanies use of the GMP library. Failure to use the library correctly can lead to program failure or unexpected results.

A method and apparatus that addresses the aforementioned problems, as well as other related problems, are therefore desirable.

SUMMARY OF THE INVENTION

In various embodiments, the invention provides a method and apparatus for processing numerical values of arbitrary and expandable precision. In various embodiments, the invention provides an arbitrary and expandable high-precision datatype for declaring "large-integer" data. The datatype encapsulates large-integer data and associated operations. The large-integer data has runtime expandable precision, and the operations perform functions on large-integer data and system integer data in a manner that is functionally equivalent to corresponding language-provided integer operations. The large-integer data is interoperable with system integer data. A user is unburdened with special commands and syntax by virtue of overloading the language-provided integer operations with the operations of the large-integer datatype.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The present invention is directed to a datatype ("LargeInt") that supports values of arbitrary and expandable precision. The precision of LargetInt variables is limited only by the available computing resources, for example, RAM. In addition, the size of a LargeInt variable can be fixed either at compile time or at runtime. A user program manipulates LargeInt variables using the same functions as are available with standard precision or double precision integers. The underlying methods that manipulate LargeInt variables in response to user-programmed functions scale with the precision of the variable, and the methods efficiently manage the memory allocated to LargeInt variables.

Figure 1:
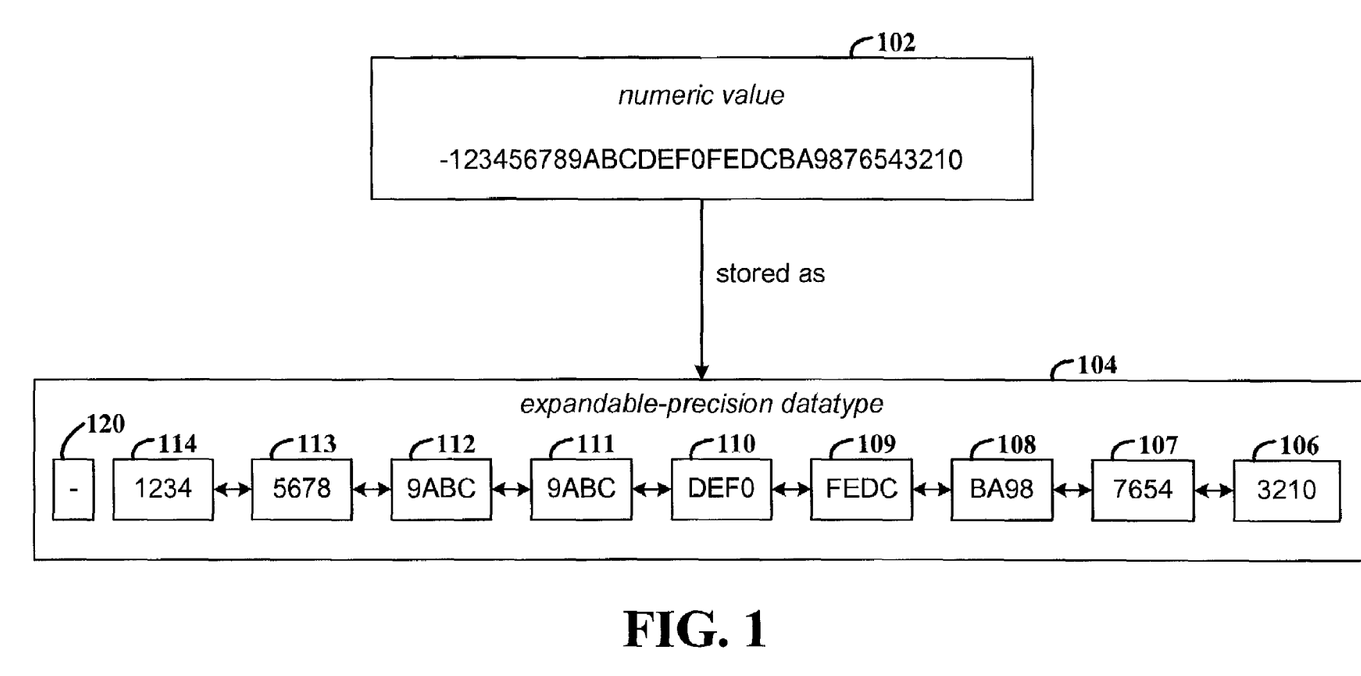
FIG. 1 is a block diagram that illustrates the relationship between a user's view of a numeric value that is of a LargeInt datatype and the underlying storage of the value in accordance with an example embodiment of the invention.

FIG. 1 is a block diagram that illustrates the relationship between a user's view of a numeric value that is of a LargeInt datatype and the underlying storage of the value in accordance with an example embodiment of the invention. Block 102 illustrates the numeric value as viewed by a user, and block 104 illustrates the memory allocated for storage of the numeric value of block 102. It will be appreciated that for ease of description, the numeric value shown in blocks 102 and 104 is in hexadecimal format.

Each of blocks 106-114 is referred to as an IntNode and stores n bits of the numeric value (n is user-customizable; 16 bits in the example), with the least significant bits (LSBs) in IntNode 106 and the most significant bits (MSBs) in IntNode 114. In one embodiment, the IntNodes are stored as a doubly-linked list for ease of traversal. Each variable of LargeInt type has an associated sign bit, and the sign bit of the numeric value is stored in block 120.

Usage of the LargeInt datatype in a program is straightforward and does not require knowledge of the underlying storage scheme or methods. For example, the following code fragment shows manipulation of variable of a conventional integer datatype.

int X, Y=5;
cin>>X;
if (X<3)
return X+0x7FFF;
else
return X % (Y<<02);

The following code fragment shows the variables X and Y declared of the type LargeInt. Note that from the programmer's view the manipulation of the variables remains the same.

LargeInt X, Y=5;
cin>>X;
if (X<3)
return X+0x7FFF;
else
return X % (Y<<02);

By implementing the LargeInt datatype in C++, normal integer operators are overloaded with functions that manipulate variables of the LargeInt datatype. This allows the LargeInt datatype to operate transparently relative to the programmer. In addition, LargeInt data can be manipulated in combination with all standard datatypes, including all signed and unsigned integral types, floating point types, Boolean, and character arrays. Appendix A illustrates, in an example embodiment, encapsulation of the LargeInt datatype and how language provided operators are overloaded with LargeInt functions. The functions that operate on LargeInt data manipulate LargeInt data as stored in IntNodes as compared to language-provided functions which operate on system integers. Those skilled in the art will appreciate that various modifications can be made to the header file of Appendix A to accommodate different or additional implementation requirements.

Figure 2:
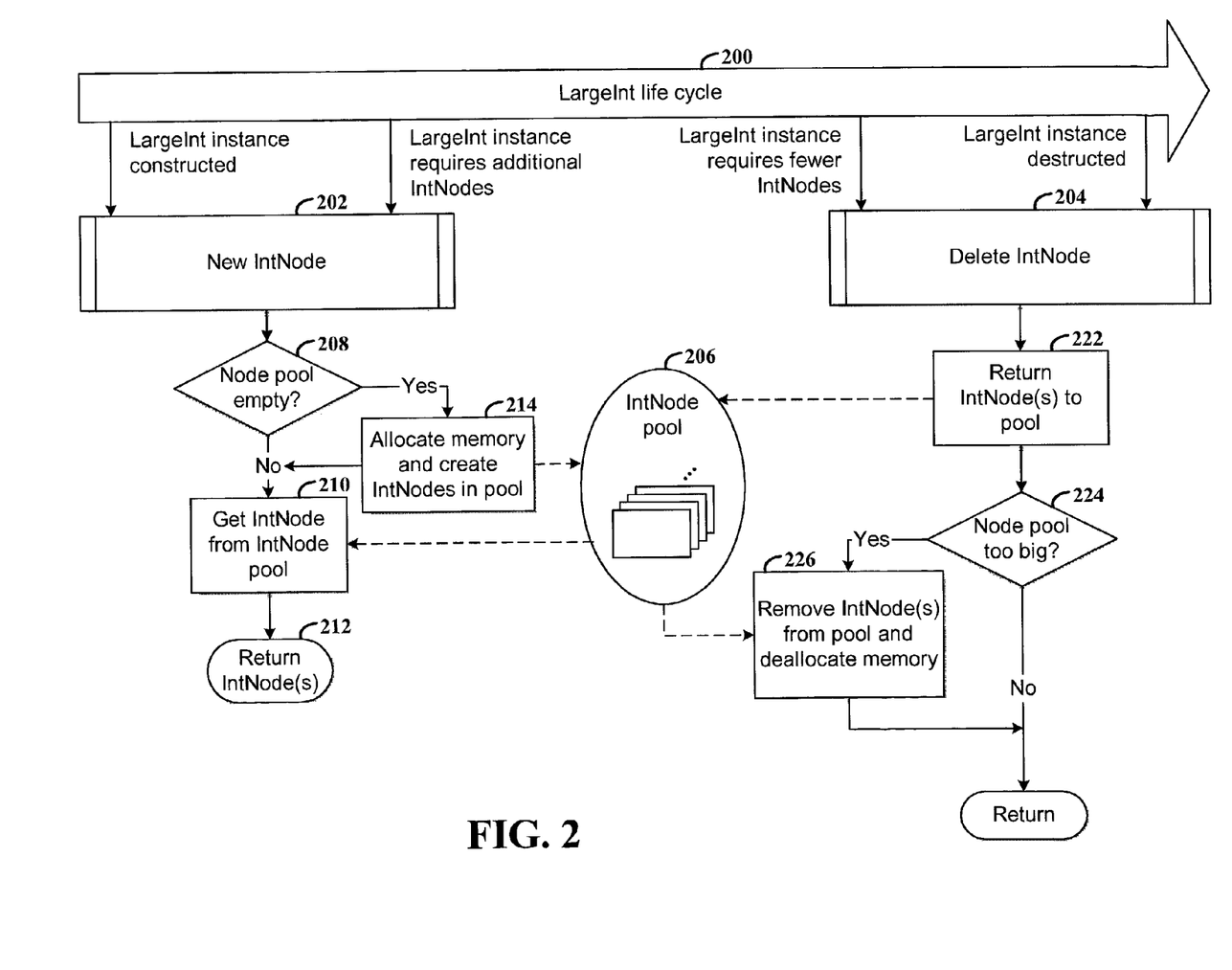
FIG. 2 is a flow diagram that illustrates the process flow of a memory manager for IntNodes, of which the LargeInt datatype is internally composed.

FIG. 2 is a flow diagram that illustrates the process flow for IntNode memory management for variables of the LargeInt datatype. The process is illustrated and described in terms of the life cycle of a variable of the LargeInt datatype (200). Block 202 commences allocation of a new or additional IntNodes to a variable, and block 204 commences deletion of one or more IntNodes, for example, when fewer IntNodes are required or the variable is destroyed.

The "New IntNode" function is initiated when IntNodes are initially allocated for a LargeInt variable or when additional IntNodes are required for a variable. IntNodes are allocated from IntNode pool 206, which in one embodiment is a list of unused IntNodes. If pool is not empty (step 208), an IntNode is removed from the pool (210) and returned to the calling routine. An example calling routine is an arithmetic function that is invoked to manipulate a LargeInt variable. If the node pool is empty, additional memory is allocated and new IntNodes are created in the IntNode pool (step 214).

The "Delete IntNode" function is initiated when a LargeInt variable requires fewer IntNodes or when a LargeInt variable is no longer needed. The unneeded IntNodes are returned (step 222) to the IntNode pool 206. When the IntNode pool reaches a selected maximum size (step 224), IntNodes are removed from the pool (step 226), and the associated memory is deallocated. Control is then returned to the calling routine.

Custom memory management is achieved by overloading the C++ new and delete operators for IntNodes. By doing so, the underlying memory management of the IntNodes is transparent to the algorithms and functions that manipulate IntNodes.

Figure 3:
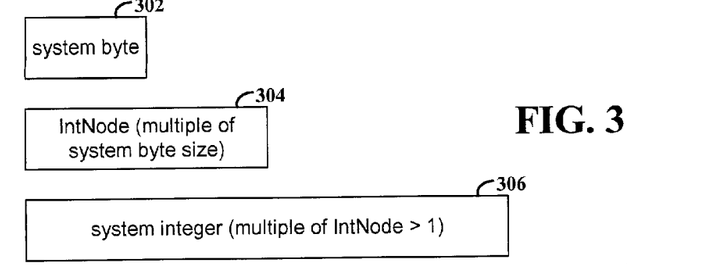
FIG. 3 is a block diagram that illustrates the relationship between the sizes of a system byte, an IntNode, and a system integer.

FIG. 3 is a block diagram that illustrates the relationship between the sizes of a system byte 302, an IntNode 304, and a system integer 306. The number of bits in system byte 302 is defined by the system in which the present invention is used. For example, most systems operate with 8-bit bytes. The size of the IntNode must be a multiple of bytes, but the exact multiple can be varied by the user to optimize memory usage. The selected size of the IntNode is also influenced by the size of a system integer. The size of the system integer must be a multiple (>1) of the size of the IntNode. This optimizes processor performance and register usage by making sure that the result of a multiplication of two IntNodes can fit in a system integer.

Figure 4A:
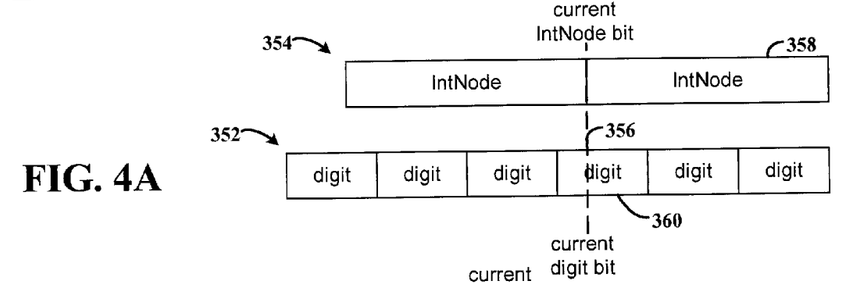
FIG. 4A is a block diagram that illustrates converting between a character array and a LargeInt variable where each character digit is represented with fewer bits than are available in an IntNode.
Figure 4B:
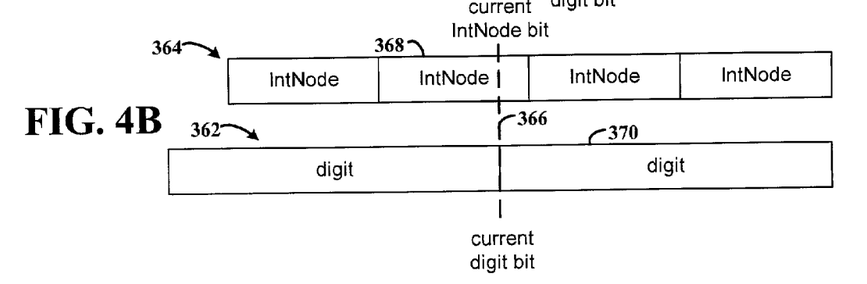
FIG. 4B is a block diagram that illustrates relative bit positions in converting between a character array and a LargeInt variable where each character digit is represented with more bits than are available in an IntNode.
Figure 4C:
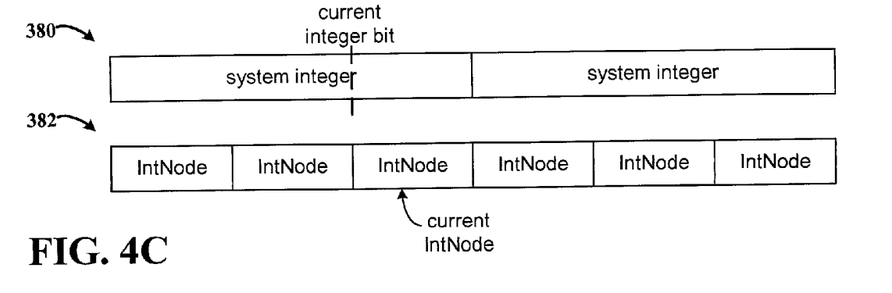
FIG. 4C is a block diagram that illustrates relative bit positions in converting between a system integer and a LargeInt variable where, for example, the number of bits used to represent a system integer is equal to the number of bits in three IntNodes.

FIGS. 4A, 4B, and 4C illustrate how operations on LargeInt variables are independent of the number of bits per byte, the number of bits per digit, and the number of bytes per integral types. "Digit" refers to base-n digits in a character array, where character arrays are used to serialize LargeInts, for user input and output, and as constants.

FIG. 4A is a block diagram that illustrates converting between a character array 352 and a LargeInt variable 354 where each character digit is represented with fewer bits than are available in an IntNode. Line 356 shows that the current bit in IntNode 358 (left-most bit) corresponds to and has the same value as the current digit bit in digit 360.

FIG. 4B is a block diagram that illustrates relative bit positions in converting between a character array 362 and a LargeInt variable 364 where each character digit is represented with more bits than are available in an IntNode. Line 366 shows that the current IntNode bit in IntNode 368 corresponds to and has the same value as the current digit bit in digit 370.

FIG. 4C is a block diagram that illustrates relative bit positions in converting between a system integer 380 and a LargeInt variable 382 where, for example, the number of bits used to represent a system integer is equal to the number of bits in three IntNodes. Two integers are shown to clarify what happens at the boundary between integers. Because a "system integer" is exactly filled by a multiple of IntNodes, the integer is filled one whole IntNode at a time. This is in contrast to the IntNode/digit conversion, where there's no guarantee that digit and IntNode boundaries will be aligned, and therefore they must be filled bit by bit.

The LargeInt datatype supports fixed-bit data and constants that are larger than a system integer. Fixed-bit support operates by converting signed operands into unsigned operands of the specified bit length (e.g., using standard two's compliment), performing the normal operations, and then truncating the results to the specified bit length. For example, the example code fragment below illustrates LargeInt support of arbitrary fixed-bit data.

```
LargeInt::SetFlag(LargeInt::FixedBit, 32);
LargeInt X=-1, Y=0x7E00;
cout<<hex<<(X^Y);
LargeInt Z=0xFFFFFFFF;
cout<<Z+1;
LargeInt::SetFlag(LargeInt::FixedBit, Off);
cout<<Z+1;
```

In this example implementation of fixed-bit support, the statement LargeInt::SetFlag(LargeInt::FixedBit, 32) signals to the methods that implement operations on LargeInt variables that subsequent operations are to be performed using fixed-point operations. The statement, LargeInt::SetFlag (LargeInt::FixedBit, Off), turns off fixed-point operations on LargeInt variables. The output from the statement cout<<hex<<(X^Y) is 0xFFFF81FF, the output from the first statement cout<<Z+1 is 0x00000000, and the output from the second statement cout<<Z+1 is 0x10000000.

From the foregoing example code fragment, it can also be seen that input and output of LargeInt data can be accomplished by reference to language-provided input/output functions. For example, the LargeInt value Z+1 is output with the cout function. This is done by overloading the <<and >> operators with respect to the Standard C++ ostream and istream input/output classes. Input/output can also be accomplished by doing a standard (const char *) cast on a LargeInt variable.

Constants that are larger than a system-provided integer are supported with the LargeInt datatype. LargeInt variables that are used as constants can be constructed from strings of characters. The following statement illustrates an implicit conversion of a character string to a LargeInt variable.

MyLargeInt+="12345678912345678123456789";

The statement below illustrates an explicit conversion from a character string to a LargeInt variable.

MyLargeInt=(LargeInt)
    "0x123456789ABCDEF123456789ABCDEF"/
    1234;

Another example of explicit conversion from a character string to a LargeInt variable is shown in the statement below.

MyLargeInt=LargeInt
    ("1101110101001001001001010010101010011001")<<2;

The methods that perform operations on LargeInt variables sometimes require storage for intermediate results that are accumulated in the computation. Because LargeInt operations operate on lists of IntNodes instead of standard integers, it is important that the LargeInt operations efficiently manage storage for the intermediate results. One way in which the LargeInt operations efficiently manage storage for intermediate results is explained below. The example that follows illustrates handling of intermediate results.

The following code fragment illustrates a typical internal LargeInt operation.

```
{
LargeInt RetVal;
// Create result of the operation
// Store the result in RetVal
return RetVal;
}
```

RetVal is a temporary variable because it is destroyed after the operation is complete. Another temporary variable will be created from the return value.

In the statement:

$X=Y+Z+W;$ a temporary variable ("temporary") is created to store the intermediate results of the return value of (Y+Z), which is then provided as a parameter to:

operator+(temporary, W);

Another temporary variable is created from the return value of (temporary+W) and is provided as a parameter to:

X::operator=(temporary);

In all cases, the temporary variable has the same value as the return value, and the return value will be destroyed later. Instead of copying RetVal's list of IntNodes into the newly constructed temporary LargeInt variable, the list of IntNodes for RetVal is moved. This involves copying the LSB and MSB pointers from RetVal to the temporary variable, and then setting RetVal's pointers to NULL during the construction (LargeInt(LargeInt)) or assignment (operator=(LargeInt)) of the new LargeInt variable. Thus, instead of an a cost O(n) for traversing and copying the list of IntNodes from RetVal to the temporary (involves constructing n new IntNodes), and then traversing the list again in order to destruct RetVal's n IntNodes, only two pointers are copied.

In order for the methods that perform operations on LargeInt variables to discern between temporary and non-temporary LargeInt variables, a class flag is set to indicate that the next parameter will be a temporary variable. For example, in the preceding code fragment, because the RetVal will be copied and then destroyed, an internal flag can be set at the end of that function. Because the next LargeInt function that will be called will be the construction or assignment of RetVal, this function will see that flag.

In another embodiment of the invention, a recursive divide-and-conquer algorithm is used for the divide operator. The following explanation uses the following notation for a divide operation:

divide (LValue, RValue) returns (Result, Remainder)

LValue is the dividend, RValue is the divisor, Result is the quotient, and Remainder is the remainder.

The first part of the algorithm is to adjust the signs of the operands and results so that the division operation is performed on positive numbers. In addition, if (LValue<RValue) then the algorithm returns (0, LValue).

The second part of the algorithm begins with recognition of the fact that:

$L\text{Value}=Result*R\text{Value}+Remainder$ (eq. 1)

From this, LValue is redefined as:

$L\text{Value}=UpperValue*Power+LowerValue$ (eq. 2)

UpperValue can be viewed as a selected group of the MSBs, and LowerValue can be viewed as the remaining LSBs. The value of Power is selected as a power of 2 so that the multiplication is achieved by shift operations. For example, if Power is 2^32, then:

$UpperValue=L\text{Value}>>32$ and $LowerValue=L\text{Value}\ [31\ downto\ 0]$

The next part of the algorithm involves recursion. First, the UpperValue is divided by RValue:

Divide(UpperValue, RValue)

which returns (UpperResult, UpperRemainder).

Substituting for UpperValue in equation 2 yields:

$L$Value=(UpperResult*$R$Value+UpperRemainder)*Power+LowerValue (eq. 3a)

Rearranging the preceding equation yields:

$L$Value=(UpperResult*Power)*$R$Value+(UpperRemainder* Power+LowerValue) (eq. 3b)

Then the algorithm recursively divides the lower part of the LValue:

Divide (UpperRemainder*Power+$L$owerValue, $R$Value)

which returns (LowerResult, LowerRemainder).

LValue can now be reexpressed as:

$L$Value=(UpperResult*Power)*$R$Value+ (LowerResult*$R$Value+LowerRemainder)(eq. 4a)

which is rearranged as:

$L$Value=(UpperResult*Power+LowerResult)*$R$Value+ LowerRemainder (eq. 4b)

The required format for the final answer is:

Result=UpperResult*Power+LowerResult

Remainder=LowerRemainder

In order to effectively divide the work between the two recursive-divide branches, the number of bits that represent UpperValue and the number of bits that represent (UpperRemainder*Power+LowerValue) are selected to be equal. Recall that the two recursive divide branches are:

Divide (UpperValue, RValue) returns (UpperResult, UpperRemainder)

and

Divide (UpperRemainder*Power+LowerValue, RValue) returns (LowerResult, LowerRemainder)

The following description explains how a value for Power is selected in each level of the recursion. The description denotes the number of bits used to represent X by NumBits (X). MaxNumBits(X) means that although NumBits(X) may vary, NumBits(X) will always be less than or equal to MaxNumBits(X). Power is 2 raised to some power (exponent), and PowExp refers to the exponent. Assuming that each bit in X is an independent, binary random variable with a 50% probability of being either a 1 or a 0, MaxNumBits(X) provides a reasonable estimation of NumBits(X). To begin, NumBits(UpperValue)=NumBits($L$Value)−PowExp (eq. 5)

MaxNumBits(LowerValue)=PowExp

MaxNumBits(UpperRemainder)=NumBits($R$Value)

MaxNumBits(UpperRemainder*Power)=NumBits(RValue)+PowExp

MaxNumBits(UpperRemainder*Power+LowerValue) =NumBits(RValue)+PowExp (eq. 6)

Because it is required that:

NumBits(UpperValue)=NumBits(UpperRemainder* Power+LowerValue)

then substituting equations 5 and 6 into that yields:

NumBits(LValue)−PowExp=NumBits(RValue)+PowExp

PowExp=ceiling(NumBits(LValue)−NumBits(RValue)) /2

Thus, the optimum partitioning of the recursive divide between the upper and lower parts of the dividend is the ceiling of ½ the difference between the number of bits in the dividend (LValue) and the number of bits in the divisor (RValue).

The base case for the recursive divide-and-conquer algorithm is when UpperResult=0. If UpperResult=0, then it is known that LValue/RValue<2. This is because LValue and RValue differ in length by zero or one bit, and after shifting LValue by the number of bits that represent Power in order to obtain UpperValue, UpperValue will be less than RValue, and the recursive divide returns (0, UpperValue). Because LValue/RValues<2, the algorithm returns (1, LValue-RValue).

From the foregoing it will be appreciated that the base case in the recursive divide-and-conquer algorithm performs a simple subtraction, and recombining the results in the recursion requires only additions and bit shifting. Thus, the division is accomplished with additions and shifting of bits. In addition, with each level of recursion, the value of Power is chosen by halving the difference ("bit difference") between NumBits(LValue) and NumBits(RValue). Thus, the depth of the recursion tree is $\log_2$(bit difference). By comparison, a standard division algorithm, which shifts the divisor by 1 bit with each level, has a depth that is equal to the bit difference. Thus, the division algorithm of the present invention is O (log (bit difference)) in a best case scenario. An added benefit is that the result and remainder are available at the same time instead of arriving at the value through separate computations.

The present invention has been described in terms of operations on integer data in the context of a specific implementation in the C++ programming language. Those skilled in the art will appreciated that interoperable floating-point and rational datatypes can be constructed using the LargeInts datatype as the exponent/mantissa and numerator/denominator as appropriate. In addition, the invention could be implemented in any of a variety of programming languages, including both object-oriented and non-object-oriented programming languages, without departing from the present invention as set forth in the following claims.

What is claimed is:

1. A computer-implemented method for processing numerical values in a computer program executable on a computer system, comprising:
   encapsulating in a large-integer datatype, large-integer data and associated large-integer operators, wherein the large-integer data has runtime expandable precision and maximum precision is limited only by system memory availability;
   overloading language-provided arithmetic, logical, and type conversion operators with the large-integer operators that operate on large-integer variables in combination with other datatypes, and programmed usage of a variable of the large-integer datatype is equivalent to and interoperable with a variable of a system-defined integral datatype;

establishing a plurality of available storage nodes available for allocation to large-integer data;

allocating a subset of the plurality of available storage nodes for a large-integer variable, determining a number of storage nodes to be allocated as a function of a size of the large-integer variable, and storing in each node of the subset a subset of bit values that represent a numerical value in the allocated plurality of storage nodes and forming a linked list of the allocated plurality of storage nodes;

determining a total number of available storage nodes available for allocation to large-integer data; allocating memory for a first number of available storage nodes, responsive to the total number being less than first threshold value, and establishing the first number of available storage nodes; and removing from the plurality of available storage nodes, responsive to the total number being greater than a second threshold value, a second number of storage nodes, and deallocating memory for the second number of storage nodes.

2. The method of claim 1, further comprising converting a character string into large-integer data in response to a constant definition statement.

3. The method of claim 2, further comprising converting large-integer data to and from a character string for input, output, and serialization.

4. The method of claim 1, further comprising:

converting input data from language-provided input functions to large-integer data; and converting large-integer data to a format compatible with language-provided output functions.

5. The method of claim 1, further comprising allocating a selected number of bits for each storage node in response to a program-specified parameter.

6. The method of claim 1, further comprising:

maintaining a set of available storage nodes that are not allocated to any large-integer variable;

allocating a storage node from the set of available storage nodes to a large-integer variable while performing a large-integer operation that generates a numerical value and stores the numerical value in the variable, if a number of bit values required to represent the numerical value exceeds storage available in storage nodes allocated to the large-integer variable; and returning to the set of available storage nodes a storage node allocated to a large-integer variable while performing a large-integer operation that generates a numerical value for storage in the variable, if a number of bit values required to represent the numerical value is less than storage available in storage nodes allocated to the variable.

7. The method of claim 6, further comprising overloading language-provided memory allocation and deallocation operators with large-integer operators that allocate and deallocate storage nodes.

8. The method of claim 1, further comprising, responsive to a large-integer divide operation specifying an input dividend and divisor:

identifying a set of most-significant bits of the dividend and a set of least-significant bits of the dividend;

recursively performing a large-integer divide operation using the set of most-significant bits as the input dividend, and returning a quotient and a remainder;

finding a lower-part dividend as a function of the remainder and the set of least-significant bits;

recursively performing a large-integer divide operation using the lower-part dividend; and concurrently solving for the quotient and the remainder.

9. The method of claim 8, further comprising identifying an optimal set of most-significant bits of the dividend and a set of least-significant bits of the dividend as a function of a number of bits that represent the dividend and a number of bits that represent the divisor.

10. The method of claim 9, further comprising identifying an optimal set of most-significant bits of the dividend and a set of least-significant bits of the dividend as a function of one-half a difference between the number of bits that represent the dividend and the number of bits that represent the divisor.

11. The method of claim 1, further comprising emulating fixed-bit arithmetic on variables of the large-integer data type.

12. The method of claim 1, further comprising transferring data associated with temporary variables of the large-integer datatype by moving pointers to the data.

13. The method of claim 1, further comprising encapsulating in a large-floating-point datatype, large-floating-point data and associated operators, wherein the large-floating-point data has runtime expandable precision and maximum precision is limited only by system memory availability; and overloading language-provided arithmetic, logical, and type conversion operators for floating-point data with the large-floating-point datatype operators that operate on large-floating-point variables in combination with other datatypes, and programmed usage of a variable of the large-floating-point datatype is equivalent to and interoperable with a variable of a system-defined floating-point datatype.

14. The method of claim 1, further comprising encapsulating in a large-rational datatype, large-rational data and associated operators, wherein the large-rational data has runtime expandable precision and maximum precision is limited only by system memory availability; and overloading language-provided arithmetic, logical, and type conversion operators for rational data with the large-rational datatype operators that operate on large-rational variables in combination with other datatypes, and programmed usage of a variable of the large-rational datatype is equivalent to and interoperable with a variable of a system-defined rational datatype.

15. An apparatus for processing numerical values in a computer program executable on a computer system, comprising:

means for encapsulating in a large-integer datatype, large-integer data and associated large-integer operators, wherein the large-integer data has runtime expandable precision and maximum precision is limited only by system memory availability;

means for overloading language-provided arithmetic, logical, and type conversion operators for integers with the large-integer datatype operators that operate on large-integer variables in combination with other datatypes, and programmed usage of a variable of the large-integer datatype is equivalent to and interoperable with a variable of a system-defined integral datatype;

means for establishing a plurality of allocable storage nodes available for allocation to large-integer data;

means for allocating, for a large-integer variable, a subset of the plurality of allocable storage nodes, determining a number of storage nodes to be allocated as a function of a size of the large-integer variable; and means for storing in each node of the subset a subset of bit values that represent a numerical value in the allocated plurality of storage nodes and forming a linked list of the allocated plurality of storage nodes means for determining a total number of available storage nodes available for allocation to large-integer data;

means for allocating memory for a first number of available storage nodes, responsive to the total number being less than first threshold value, and establishing the first number of available storage nodes; and means for removing from the plurality of available storage nodes, responsive to the total number being greater than a second threshold value, a second number of storage nodes, and deallocating memory fro the second number of storage nodes.

16. The apparatus of claim 15, further comprising means for encapsulating in a large-floating-point datatype, large-floating-point data and associated operators, wherein the large-floating-point data has runtime expandable precision and maximum precision is limited only by system memory availability; and means for overloading language-provided arithmetic, logical, and type conversion operators for floating-point data with the large-floating-point datatype operators that operate on large-floating-point variables in combination with other datatypes, and programmed usage of a variable of the large-floating-point datatype is equivalent to and interoperable with a variable of a system-defined floating-point datatype.

17. The apparatus of claim 15, further comprising means for encapsulating in a large-rational datatype, large-rational data and associated operators, wherein the large-rational data has runtime expandable precision and maximum precision is limited only by system memory availability; and means for overloading language-provided arithmetic, logical, and type conversion operators for rational data with the large-rational datatype operators that operate on large-rational variables in combination with other datatypes, and programmed usage of a variable of the large-rational datatype is equivalent to and interoperable with a variable of a system-defined rational datatype.

* * * * *